(12) United States Patent
Wei et al.

(10) Patent No.: US 6,920,680 B2
(45) Date of Patent: Jul. 26, 2005

(54) METHOD OF MAKING VACUUM MICROELECTRONIC DEVICE

(75) Inventors: Yi Wei, Chandler, AZ (US); Kenneth Andrew Dean, Phoenix, AZ (US); Chenggang Xie, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 55 days.

(21) Appl. No.: 09/940,757

(22) Filed: Aug. 28, 2001

(65) Prior Publication Data

US 2003/0041438 A1 Mar. 6, 2003

(51) Int. Cl.$^7$ ................................................. H01S 4/00
(52) U.S. Cl. ..................... 29/592.1; 29/593; 445/24; 445/49; 445/50; 445/51
(58) Field of Search ............................... 445/49, 51–52, 445/24, 50; 29/601, 592.1, 830, 600; 313/311, 309, 336, 495; 156/150; 257/266, 264, 102, 101

(56) References Cited

U.S. PATENT DOCUMENTS

| | | | | | |
|---|---|---|---|---|---|
| 4,683,399 A | * | 7/1987 | Soclof | ........................ | 313/537 |
| 5,796,211 A | * | 8/1998 | Graebner et al. | ............ | 315/3.5 |
| 5,817,201 A | * | 10/1998 | Creschner et al. | ........... | 156/150 |
| 5,872,422 A | * | 2/1999 | Xu et al. | ..................... | 313/311 |
| 5,973,444 A | * | 10/1999 | Xu et al. | ..................... | 313/309 |
| 6,023,125 A | * | 2/2000 | Yoshikawa et al. | ......... | 313/310 |
| 6,249,080 B1 | * | 6/2001 | Komoda et al. | ............ | 313/310 |
| 6,297,592 B1 | * | 10/2001 | Groren et al. | ............... | 315/3.5 |
| 6,448,709 B1 | * | 9/2002 | Chuang et al. | .............. | 313/497 |
| 6,495,865 B2 | * | 12/2002 | Johnson et al. | ............. | 257/164 |
| 6,630,772 B1 | * | 10/2003 | Bower et al. | ............... | 313/311 |
| 2003/0041438 A1 | * | 3/2003 | Wei et al. | ..................... | 29/601 |
| 2003/0042834 A1 | * | 3/2003 | Dean et al. | ................. | 313/309 |

FOREIGN PATENT DOCUMENTS

| | | |
|---|---|---|
| EP | 1073090 A2 | 1/2001 |
| JP | 2000-141056 | * 5/2000 |

OTHER PUBLICATIONS

Fishbine et al., "Buckytube cold field emitter array cathode experiments", Mat. Res.Soc. Symp. Proc. vol. 359, 1995, pp. 93–98.

Zhang et al., "Plastic deformations of carbon nanotubes", Physical Review Letters, Dec. 14, 1998, pp. 5346–5348.

* cited by examiner

*Primary Examiner*—Minh Trinh

(57) ABSTRACT

A method of forming a vacuum microelectronic device including steps of forming at least one electron emitter on a substrate, applying a first electric field to move a portion of the at least one electron emitter in a direction toward the first electric field, and maintaining the at least one electron emitter in the direction after removing the first electric field.

7 Claims, 2 Drawing Sheets

METHOD OF MAKING VACUUM MICROELECTRONIC DEVICE

BACKGROUND OF THE INVENTION

The present invention relates, in general, to electronics, and more particularly, to electron emission devices.

One of the recent advances in vacuum microelectronics led to the use of nanotubes as electron emitters. Typically, nanotubes are fine filaments made from carbon as disclosed by Cees Deckker, Carbon Nanotubes as Molecular Quantum Wires, Physics Today, pp. 22–28, May 1999. The nanotubes are applied to a substrate to function as electron emitters. Typically, the nanotubes disposed on the substrate have a random orientation. Because of this random orientation, the emitters and devices using the emitters have a low efficiency, measured as anode current divided by cathode current. Typically, the efficiency is less than three percent. Additionally these devices often have high leakage current, measured as gate current divided by cathode current. The leakage current generally is greater than ninety-seven percent.

Accordingly, it is desirable to have a formation method that results in electron emitters that have a high efficiency (greater than three percent) and a low leakage current (less than ninety-seven percent).

BRIEF DESCRIPTION OF THE DRAWINGS

For simplicity and clarity of illustration, elements in the figures are not necessarily to scale, and the same reference numbers in different figures denote the same elements. Additionally, descriptions and details of well known steps and elements are omitted for simplicity of the description.

DETAILED DESCRIPTION OF THE DRAWINGS

Previous methods of forming nanotube emitters, including carbon nanotube emitters, result in the nanotube emitters having random orientation to each other and to the anode which is used in extracting electrons from the emitters. Because of the random orientation, many of the electrons are emitted at random angles to the anode, thus, the emitted electrons are often attracted to various other elements and not the anode. This results in high leakage currents. Because of the high leakage current, a vacuum microelectronic device using the randomly-oriented nanotube emitters has to operate at a high potential in order to compensate for the electrons not reaching the anode. More expensive control electronics is required to control a vacuum microelectronic device operating at a high voltage while less expensive control electronics can be used with lower voltage operation.

The present invention provides for electron emitters which are formed by a novel method that provides high efficiency and low leakage current. The electron emitters can be used for various vacuum microelectronic devices including field emission displays, Radio Frequency (RF) devices including RF amplifiers, X-Ray sources, and radiation hardened electronics.

Figure 1:
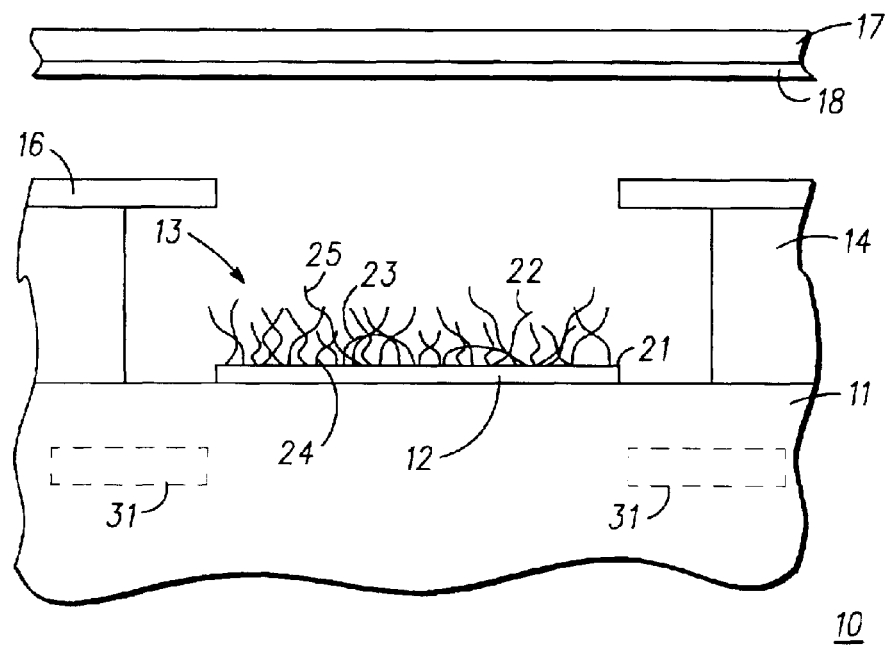
FIG. 1 schematically illustrates an enlarged cross-sectional portion of an embodiment of a vacuum microelectronic device at a stage of manufacturing in accordance with the present invention.

FIG. 1 schematically illustrates an embodiment of a vacuum microelectronic device 10 having electron emitters formed in accordance with the present invention. The electron emitters of device 10 include nanotubes which are formed by a novel method that increases the efficiency and lowers leakage current during the operation of device 10. In the preferred embodiment, device 10 is a type of vacuum electronic device often referred to as a field emission display. Device 10 includes a substrate 11 upon which electron emitters are formed. Typically, substrate 11 is an insulating material such as various types of glass and ceramics. Substrate 11 may also be a semiconductor material such as a silicon wafer. An attachment site 12 is formed on a surface of substrate 11 where electron emitters are to be positioned. In some embodiments site 12 may be a catalyst applied to the surface of substrate 11 wherein the catalyst is utilized as a seed to precipitate the formation of nanotube electron emitters. In other embodiments, site 12 can be merely an area on the surface of substrate 11 or can be a conductor that may be used for providing electrical contact to the electron emitters. At least one electron emitter 22, and typically a plurality of electron emitters 13, is formed on site 12 by a variety of techniques that are well known to those skilled in the art including CVD deposition, carbon arc deposition, or screen printing nanotube filaments onto site 12. Various techniques to apply nanotubes to a substrate are described in a paper by Nae Sung Lee et al, Carbon Nanotube-Based Field Emission Displays for Large Area and Full Color Applications, Japan Journal of Applied Physics, Vol 39, pp. 7145–7158, December 2000. Electron emitter 22 and plurality of electron emitters 13 can be a formed from a variety of materials including carbon, metal, and semiconductor materials including silicon, indium phosphide, gallium arsenide, and cadmium selenide.

Other electron emitters including electron emitters 21, 23, and 24 may also be formed on site 12 along with emitter 22. Such a plurality of emitters shall be referred to herein as plurality of electron emitters 13. In the preferred embodiment, plurality of electron emitters 13 are formed as carbon nanotubes on site 12 by a screen printing procedure. In this preferred embodiment, the length of each nanotube in electron emitters 13 may vary between one-half and ten microns and the diameter or width may vary between one and three hundred nano-meters.

Typically, device 10 includes a gate electrode 16 that, in one embodiment, generally is insulated from substrate 11 by a dielectric 14. Dielectric 14 may be formed from a variety of materials such as silicon dioxide, silicon nitride, polyimide, a vacuum, or other insulator material. Dielectric 14 has a thickness that positions gate electrode 16 proximal to and spaced apart from electron emitters 13 to provide isolation therebetween.

An anode 17 typically overlies electron emitters 13 and is utilized to collect electrons extracted from electron emitters 13. In the preferred embodiment, anode 17 includes a phosphor coating 18 to provide a visual display.

In some embodiments, gate electrode 16 may be positioned so that electron emitters 13 are between electrode 16 and anode 17 as shown by a gate electrode 31 (dashed lines) illustrating an alternate placement for gate electrode 16. In other embodiments, gate electrode 16 and gate electrode 31 may be omitted so that device 10 may operate in other modes, such as operating as a diode.

After formation, the nanotubes comprising electron emitters 13 typically exhibit a random orientation and direction relative to each other. A first electron emitter, for example at least electron emitter 22, can be oriented toward a first direction while another electron emitter, such as electron emitter 25, may be oriented toward a second direction that is different from the first direction.

Figure 2:
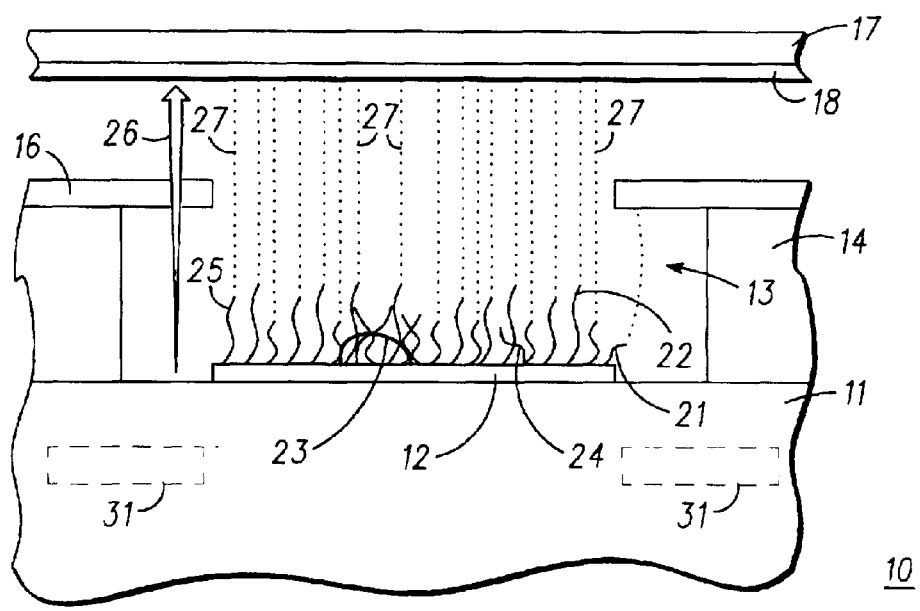
FIG. 2 schematically illustrates the enlarged cross-sectional portion of the vacuum microelectronic device of FIG. 1 at a subsequent manufacturing stage in accordance with the present invention.

FIG. 2 schematically illustrates device 10 at a subsequent formation stage during a conditioning of electron emitters 13. An electrical connection is made to electron emitters 13 and separate electrical connections are made to anode 17 and gate electrode 16. Typically, the electrical connection to electron emitters 13 is accomplished through site 12, for example, through a conductor in electrical contact to site 12. Such electrical connections and connecting methods are well known to those skilled in the art.

A first electric field is applied between anode 17 and the electrical connection to electron emitters 13. An arrow 26 illustrates the general direction of the electric field extending from substrate 11, via site 12, to anode 17. At sufficiently large electric field values, some of the electron emitters are moved from the original electron emitter position to a different position that is in a direction toward the direction of the electric field (for example, toward arrow 26). For example, electron emitters 22 and 25 may be moved from their original position toward the direction of the electric field. Other emitters, such as electron emitter 23, may be connected at both ends to site 12 and may not be moved by the electric field. Still other electron emitters may have a length that is not sufficient to provide the electron emitter sufficient flexibility to move, for example electron emitter 21. Hereinafter such an electric field value or intensity shall be referred to as the movement threshold value and the corresponding electric field shall be referred to as the movement field.

Once the movement field is removed, each electron emitter typically relaxes back to the original position of that particular electron emitter. However, if the first electric field is applied with a value sufficiently in excess of the movement threshold value, distal ends of some of electron emitters 13 will once again be moved toward the direction of the electric field; however, upon removal of this first electric field, emitters 22 and 25 are maintained in the direction toward the electric field. Hereinafter such a value or intensity of the first electric field is referred to as the conditioning threshold value and the field is referred to as the conditioning field.

The values for the movement field and the conditioning field depend on a variety of physical characteristics of the electron emitters. Some of these characteristics include the length of the longest nanotube filaments, the average diameter of the nanotube filaments, the number of nanotube filaments having lengths close to the length of the longest filament, and numerous other physical characteristics. For a particular vacuum microelectronic device, the threshold values for both the movement and conditioning fields are determined experimentally. Typically, other devices manufactured to have similar physical characteristics are assume to have similar threshold values. For typical electron emitters having an average diameter between one to fifteen nano-meters and a length between three to five microns, a typical conditioning field varies between one to forty volts per micro-meter (1–40 V/micro-meter). For other geometries, the conditioning field can vary from 0.2 to 50 volts per micro-meter.

Thus, FIG. 2 schematically illustrates device 10 while applying the conditioning electric field to extend in a direction away from substrate 11 and move distal ends of at least one of electron emitters 13, such as electron emitter 22, toward a direction of the conditioning electric field (illustrated by arrow 26). Applying the condition electric field also results in extracting electrons from electron emitters 13 at a current density that is sufficient to move at least one of the electron emitters, such as electron emitter 22, to a direction away from the site 12. While applying the conditioning field, gate electrode 16 typically is allowed to float to the potential determined by the value of the conditioning field. Allowing gate electrode 16 to float, prevents it from having a voltage that attracts either electron emitters 13 or the extracted electrons to gate electrode 16 thereby assisting electron emitters 13 to move toward the electric field and not toward gate electrode 16. Alternately, gate electrode 16 may have a potential that is less than the voltage that would satisfy the conditioning field value thereby assisting in repelling both emitted electrons and electron emitters 13 away from gate electrode 16 and toward the direction of the conditioning field. While applying the conditioning field, electron emitters, such as emitter 22, can have an internal current density of at least $1 \times 10^4$ amperes per square centimeter.

Because of the large value of the conditioning field, it can cause damage to electron emitters 13 or anode 17 or phosphor 18 if applied for more than a brief period of time. Consequently, the conditioning field is generally applied in a pulsed manner that alternately applies and removes the electric field. A typical repetition rate and period can vary between one-half to three milliseconds with a five to twenty percent duty cycle.

Figure 3:
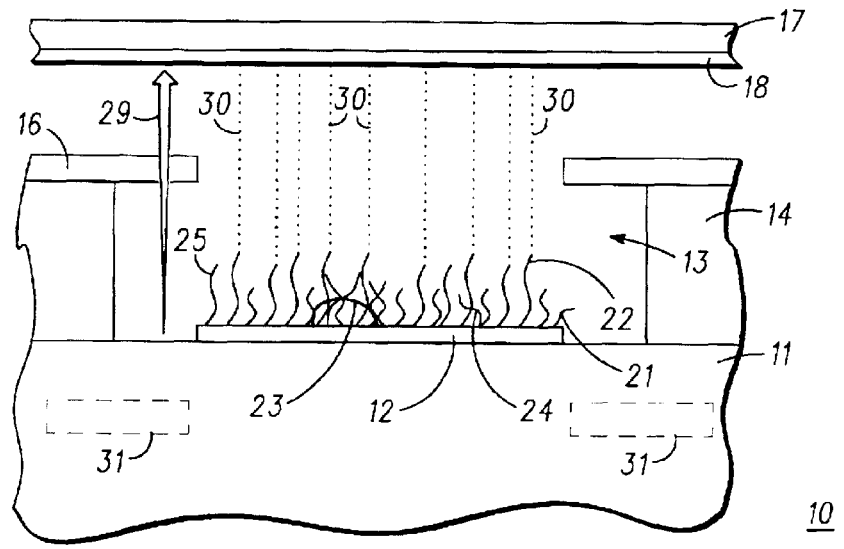
FIG. 3 schematically illustrates the enlarged cross-sectional portion of the vacuum microelectronic device of FIG. 2 in operation in accordance with the present invention.

FIG. 3 schematically illustrates device 10 in operation after the conditioning electric was applied and subsequently removed. In operation, a second electric field or operating field, illustrated generally by an arrow 29, is applied between anode 17 and the electrical connection to electron emitters 13 in a manner similar to that used for applying the first electric field. The intensity or value of the operating field is established according to the best operating characteristics for device 10. The value required for the operating field is less than the value of the conditioning field and typically is fifty to ninety five percent of the value of the conditioning field.

Because at least one of the plurality of electron emitters 13 remains pointing in a direction toward the electric field after the application and removal of the conditioning field, electron emitters 13 emit electrons that generally travel to anode 17 thereby increasing the current density collected by anode 17 for a given value of operating field. The increase current density assists in increasing the efficiency of device 10 compared to a device that was not formed by applying the conditioning field.

Those skilled in the art will understand that during the process of manufacturing a vacuum microelectronic device, anode 17 may be a temporary anode that is position proximal to the electron emitters for conditioning the electron emitters. Thereafter, at a different step in the process of forming a vacuum microelectronic device, a different anode may be formed to overly substrate 11 and the electron emitters. This different anode can be positioned at a distance that facilitates operating the vacuum microelectronic device. For example, the different anode can be positioned to assist in operating a field emission display device in either the enhancement mode or in a different position to facilitated operating in the depletion mode. Both enhancement and depletion operating modes are well known to those skilled in the art. In another embodiment, the different anode may be positioned to facilitate operating the vacuum microelectronic device as a diode.

Figure 4:
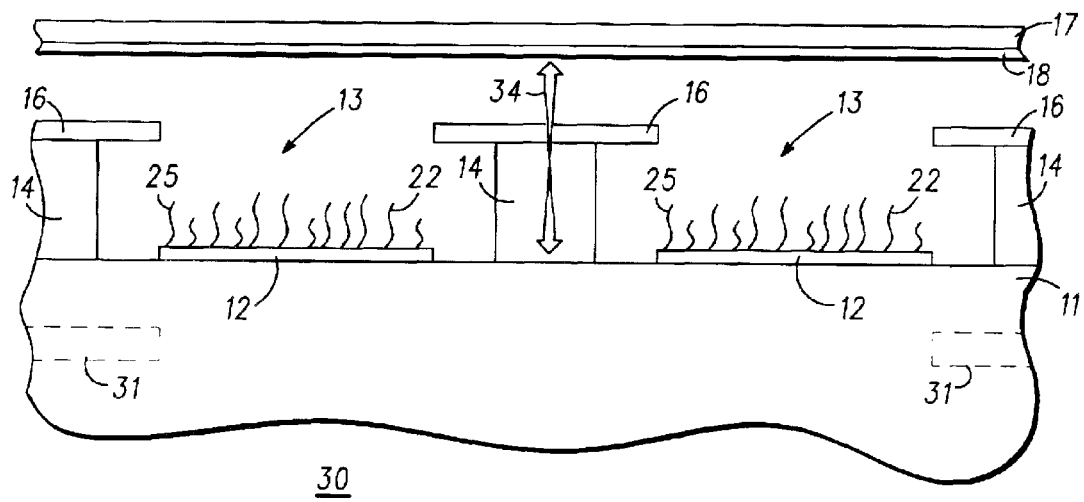
FIG. 4 schematically illustrates another enlarged cross-sectional portion of the device of FIG. 3 in accordance with the present invention.

FIG. 4 schematically illustrates an enlarged cross-sectional portion of a vacuum microelectronic device 30 that is an alternate embodiment of device 10 shown in FIG. 3. Device 30 illustrates the placement of a plurality of attachment sites 12 on substrate 11. At least one electron emitter, such as electron emitter 22, and typically a plurality of electron emitters 13 is formed on each attachment site 12. Device 30 also includes an anode 36 overlying electron emitters 13. During the process of manufacturing device 30, anode 17 (See FIG. 3) was utilized to condition electron emitters 13. Thereafter, anode 36 is disposed to overlie each attachment site 12. Thus, anode 36 is positioned subsequent to conditioning the electron emitters utilizing the methods described hereinbefore.

By now it should be appreciated that there has been provided a novel way to form a vacuum microelectronic device. By applying a conditioning voltage between the anode and electron emitters of the device, electron emitters are moved in a direction toward the electric field and remain in such a position after the conditioning field is removed. Moving the electron emitters results in more electrons striking the anode for a given operating electric field value there by increasing the efficiency, and also results in fewer electrons striking the gate electrode thereby reducing the leakage current of the device.

While the invention is described with specific preferred embodiments, it is evident that many alternatives and variations will be apparent to those skilled in the semiconductor arts. More specifically those skilled in the art understand that the vacuum microelectronic device may have several attachment sites such as site 12 and corresponding electron emitters formed thereon in order to form a field emission display device, field emission diode, field emission triode or other field emission device.

What is claimed is:

1. A method of forming a vacuum microelectronic device comprising:

forming at least one electron emitter on a substrate;

applying a conditioning electric field having a value of at least 0.2 to 50 volts per micro-meter to move a portion of the at least one electron emitter in a direction toward the conditioning electric field, wherein the conditioning electric field maintains the at least one electron emitter in the direction of the conditioning electric field after removing the conditioning electric field; and extracting a current from the at least one electron emitter wherein the at least one electron emitter has an internal current density of at least $1 \times 10^4$ amperes per square centimeter.

2. The method of claim 1 further including subsequently operating the at least one electron emitter using an operating electric field having a value that is less than the value of the conditioning electric field.

3. The method of claim 2 wherein using the operating electric field includes using the operating electric field having a value that is less than ninety percent of the value of the conditioning electric field.

4. The method of claim 1 wherein applying the conditioning electric field includes using a sequence of alternately applying and removing the conditioning electric field.

5. The method of claim 1 wherein forming at least one electron emitter on a substrate includes forming at least one nanotube emitter on the substrate.

6. The method of claim 1 further including:

forming an anode overlying the at least one electron emitter wherein applying the conditioning electric field includes applying the conditioning electric field between the at least one electron emitter and the anode; and forming a gate electrode proximal to and displaced from the substrate.

7. The method of claim 6 further including floating the gate electrode to a potential determined by the conditioning electric field while applying the conditioning electric field.

* * * * *